US012584040B2

(12) United States Patent
McLeod et al.

(10) Patent No.: US 12,584,040 B2
(45) Date of Patent: Mar. 24, 2026

(54) DIELECTRIC HEATING OF FOAMABLE COMPOSITIONS

(71) Applicant: HENKEL IP & HOLDING GMBH, Duesseldorf (DE)

(72) Inventors: Bradley McLeod, Bloomsbury, NJ (US); Alexis Kriegl, Pittstown, NJ (US); Kris Getty, Deerfield, IL (US); Daniel Waski, Elmhurst, IL (US); Tianjian Huang, Hillsborough, NJ (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 57 days.

(21) Appl. No.: 17/219,224

(22) Filed: Mar. 31, 2021

(65) Prior Publication Data

US 2021/0214581 A1    Jul. 15, 2021

Related U.S. Application Data

(60) Division of application No. 16/359,190, filed on Mar. 20, 2019, now abandoned, which is a continuation of
(Continued)

(51) Int. Cl.
*B29C 35/12* (2006.01)
*B29C 44/12* (2006.01)
(Continued)

(52) U.S. Cl.
CPC ................. *C09J 5/08* (2013.01); *B29C 35/12* (2013.01); *B29C 44/12* (2013.01);
(Continued)

(58) Field of Classification Search
CPC ......... B31F 5/04; B29C 35/12; B29C 44/022; B29C 44/12; B29C 44/1228;
(Continued)

(56) References Cited

U.S. PATENT DOCUMENTS

| | | | |
|---|---|---|---|
| 2,147,689 | A | 2/1939 | Chaffee |
| 2,998,501 | A | 8/1961 | Edberg et al. |

(Continued)

FOREIGN PATENT DOCUMENTS

| | | |
|---|---|---|
| BR | 112020003577 A2 | 9/2020 |
| CA | 2078476 A1 | 3/1993 |

(Continued)

OTHER PUBLICATIONS

Jiao, Shunshan et al., "Principles of Radio-Frequency and Microwave Heating", Radio-Frequency Heating in Food Processing, CRC Press, 2015, p. 4. Month of Publication Unknown. (Year: 2015).
(Continued)

*Primary Examiner* — Michael A Tolin
(74) *Attorney, Agent, or Firm* — Sun Hee Thomas

(57) ABSTRACT
Microspheres refer to micro-particle dispersion systems formed by pharmaceutical molecules dispersed or adsorbed in polymer carriers such as albumin, gelatin and polylactide; and their particle sizes are different from microns to hundreds of microns.

19 Claims, 6 Drawing Sheets

Related U.S. Application Data application No. 16/359,084, filed on Mar. 20, 2019, now abandoned, which is a continuation of application No. PCT/US2018/042683, filed on Jul. 18, 2018.

(60) Provisional application No. 62/533,957, filed on Jul. 18, 2017.

(51) Int. Cl.

| | |
|---|---|
| *B29K 105/04* | (2006.01) |
| *B29K 105/16* | (2006.01) |
| *B31F 5/04* | (2006.01) |
| *B32B 5/18* | (2006.01) |
| *B32B 5/20* | (2006.01) |
| *B32B 37/06* | (2006.01) |
| *B32B 37/24* | (2006.01) |
| *B65D 3/22* | (2006.01) |
| *B65D 81/38* | (2006.01) |
| *C08J 9/00* | (2006.01) |
| *C08J 9/32* | (2006.01) |
| *C09J 5/06* | (2006.01) |
| *C09J 5/08* | (2006.01) |
| *C09J 123/08* | (2006.01) |
| *C09J 129/14* | (2006.01) |
| *D21H 19/12* | (2006.01) |
| *D21H 25/06* | (2006.01) |
| *D21H 27/32* | (2006.01) |

(52) U.S. Cl.
CPC ............ *B29C 44/1228* (2013.01); *B31F 5/04* (2013.01); *B32B 5/18* (2013.01); *B32B 5/20* (2013.01); *B32B 37/06* (2013.01); *B32B 37/24* (2013.01); *B65D 3/22* (2013.01); *B65D 81/3867* (2013.01); *B65D 81/3869* (2013.01); *C08J 9/0052* (2013.01); *C08J 9/32* (2013.01); *C09J 5/06* (2013.01); *C09J 123/0853* (2013.01); *C09J 129/14* (2013.01); *D21H 19/12* (2013.01); *D21H 25/06* (2013.01); *D21H 27/32* (2013.01); *B29K 2105/048* (2013.01); *B29K 2105/165* (2013.01); *B32B 2305/022* (2013.01); *C08J 2203/22* (2013.01); *C08J 2303/00* (2013.01); *C08J 2309/08* (2013.01); *C08J 2323/08* (2013.01); *C08J 2331/04* (2013.01); *C08J 2333/00* (2013.01); *C08J 2375/04* (2013.01); *C09J 2301/416* (2020.08); *C09J 2423/04* (2013.01); *C09J 2431/00* (2013.01)

(58) Field of Classification Search
CPC ............ B29C 44/1271; B29C 44/3415; B29C 65/4815; B29C 65/482; B29C 65/4825; B29C 65/4865; B29K 2105/048; B29K 2105/165; B32B 3/18; B32B 3/28; B32B 5/18; B32B 5/20; B32B 7/12; B32B 7/14; B32B 9/02; B32B 9/06; B32B 21/02; B32B 21/047; B32B 27/065; B32B 29/007; B32B 29/06; B32B 29/08; B32B 37/06; B32B 37/1207; B32B 37/1292; B32B 37/24; B32B 2037/1215; B32B 2037/1276; B32B 2038/0084; B32B 2038/0088; B32B 2250/03; B32B 2250/40; B32B 2255/12; B32B 2264/025; B32B 2266/02; B32B 2266/0207; B32B 2266/0221; B32B 2266/0228; B32B 2266/0242; B32B 2266/025; B32B 2266/0278; B32B 2305/022; B32B 2307/204; B32B 2307/558; B32B 2307/732; B32B 2439/00; B32B 2439/02; B32B 2439/46; B32B 2439/62; B32B 2553/00; B65D 3/22; B65D 81/3816; B65D 81/3818; B65D 81/3823; B65D 81/3839; B65D 81/3841; B65D 81/3846; B65D 81/3851; B65D 81/3853; B65D 81/3858; B65D 81/3867; B65D 81/3869; B65D 81/3874; C08J 9/0052; C08J 9/009; C08J 9/32; C08J 2203/22; C08J 2303/00; C08J 2309/08; C08J 2323/08; C08J 2331/04; C08J 2333/00; C08J 2375/04; C08J 3/28; C08K 9/08; C09J 5/06; C09J 5/08; C09J 123/0853; C09J 129/14; C09J 131/04; C09J 2301/416; C09J 2423/04; C09J 2431/00; D21H 19/12; D21H 25/06; D21H 27/30; D21H 27/32
See application file for complete search history.

(56) References Cited

U.S. PATENT DOCUMENTS

| | | | |
|---|---|---|---|
| 3,152,749 A | 10/1964 | Young | |
| 3,252,064 A | 5/1966 | Duncan | |
| 3,253,064 A | 5/1966 | Buonaiuto | |
| 3,300,360 A | 1/1967 | Williams et al. | |
| 3,342,613 A | 9/1967 | Schelhorn | |
| 3,401,475 A | 9/1968 | Morehouse et al. | |
| 3,563,851 A | 2/1971 | Armour et al. | |
| 3,583,851 A | 6/1971 | Harrington et al. | |
| 3,615,972 A | 10/1971 | Morehouse, Jr. et al. | |
| 3,732,975 A | 5/1973 | Poncy | |
| 3,904,429 A | 9/1975 | Eastman et al. | |
| 4,005,033 A | 1/1977 | Georgeau et al. | |
| 4,006,273 A | 2/1977 | Wolinski et al. | |
| 4,038,762 A | 8/1977 | Swan | |
| 4,087,002 A | 5/1978 | Bambara et al. | |
| 4,094,685 A | 6/1978 | Lester et al. | |
| 4,193,499 A | 3/1980 | Lookholder | |
| 4,350,788 A | 9/1982 | Shimokawa et al. | |
| 4,483,889 A | 11/1984 | Andersson | |
| 4,531,038 A | 7/1985 | Lillibridge | |
| 4,661,401 A | 4/1987 | Akao | |
| 4,690,843 A | 9/1987 | Inagaki | |
| 4,708,896 A | 11/1987 | Akao | |
| 4,720,410 A | 1/1988 | Lundquist et al. | |
| 4,900,594 A | 2/1990 | Quick et al. | |
| 4,925,711 A | 5/1990 | Akao et al. | |
| 5,030,302 A | 7/1991 | Jud et al. | |
| 5,082,744 A | 1/1992 | Akao et al. | |
| 5,100,721 A | 3/1992 | Akao | |
| 5,114,509 A | 5/1992 | Johnston et al. | |
| 5,236,977 A | 8/1993 | Eden et al. | |
| 5,264,467 A | 11/1993 | DiStefano | |
| 5,277,737 A | 1/1994 | Li et al. | |
| 5,288,765 A | 2/1994 | Bastioli et al. | |
| 5,325,781 A | 7/1994 | Dupont et al. | |
| 5,342,467 A | 8/1994 | Corey | |
| 5,356,683 A | 10/1994 | Egolf et al. | |
| 5,387,626 A | 2/1995 | Boehme-Kovac et al. | |
| 5,393,336 A | 2/1995 | Foran et al. | |
| 5,415,339 A | 5/1995 | Howard | |
| 5,451,437 A | 9/1995 | Insley et al. | |
| 5,542,599 A | 8/1996 | Sobol | |
| 5,612,385 A | 3/1997 | Ceaser et al. | |
| 5,636,493 A | 6/1997 | Weder | |
| 5,685,480 A | 11/1997 | Choi | |
| 5,759,624 A * | 6/1998 | Neale | B05D 7/546 |
| | | | 493/110 |
| 5,881,883 A | 3/1999 | Siegelman | |
| 5,928,741 A | 7/1999 | Andersen et al. | |
| 6,139,961 A | 10/2000 | Blakenship et al. | |
| 6,231,970 B1 | 5/2001 | Andersen et al. | |
| 6,255,369 B1 | 7/2001 | Philbin et al. | |
| 6,312,713 B1 | 11/2001 | Korol et al. | |

(56)  References Cited

U.S. PATENT DOCUMENTS

| 6,352,769 B1 | 3/2002 | Mori |
|---|---|---|
| 6,379,497 B1 | 4/2002 | Sandstrom et al. |
| 6,648,955 B1 | 11/2003 | Swiezkowski et al. |
| 6,740,373 B1 | 5/2004 | Swoboda et al. |
| 6,740,706 B2 | 5/2004 | Ohrbom et al. |
| 6,749,705 B2 | 6/2004 | Skrzyniarz et al. |
| 6,838,187 B2 | 1/2005 | Figiel et al. |
| 6,951,677 B2 | 10/2005 | Ishikawa et al. |
| 7,335,279 B2 | 2/2008 | Mohan et al. |
| 7,718,751 B2 | 5/2010 | Orpin |
| 7,799,968 B2 | 9/2010 | Chen et al. |
| 8,568,029 B2 | 10/2013 | Kannankeril et al. |
| 8,568,283 B2 | 10/2013 | Broering et al. |
| 8,574,698 B2 | 11/2013 | Fung et al. |
| 8,747,603 B2 | 6/2014 | Huang et al. |
| 9,260,633 B2 | 2/2016 | Hoa et al. |
| 9,273,230 B2 | 3/2016 | Huang et al. |
| 9,522,772 B2 | 12/2016 | Fu et al. |
| 9,580,228 B2 | 2/2017 | Fu et al. |
| 9,580,629 B2 | 2/2017 | Huang et al. |
| 9,591,937 B2 | 3/2017 | Fu et al. |
| 9,657,200 B2 | 5/2017 | Huang et al. |
| 9,771,499 B2 | 9/2017 | Huang et al. |
| 9,865,551 B2 | 1/2018 | Takano et al. |
| 10,099,459 B2 | 10/2018 | Huang et al. |
| 10,100,231 B2 | 10/2018 | Huang et al. |
| 10,144,573 B2 | 12/2018 | Fu et al. |
| 10,183,458 B2 | 1/2019 | Fu et al. |
| 10,208,429 B2 | 2/2019 | Huang et al. |
| 10,259,151 B2 | 4/2019 | Kiiskinen et al. |
| 10,815,397 B2 | 10/2020 | Thompson et al. |
| 11,104,497 B2 | 8/2021 | Lee et al. |
| 11,193,048 B2 | 12/2021 | Thompson et al. |
| 11,427,963 B2 | 8/2022 | Huang et al. |
| 2001/0049007 A1 | 12/2001 | Jones |
| 2002/0068139 A1 | 6/2002 | Polak et al. |
| 2002/0071947 A1 | 6/2002 | Soane et al. |
| 2002/0094403 A1 | 7/2002 | Ishikawa et al. |
| 2002/0115785 A1 | 8/2002 | Weitzel et al. |
| 2002/0182347 A1* | 12/2002 | DeBraal ............ B65D 81/3874 |
| | | 156/244.11 |
| 2003/0003197 A1 | 1/2003 | Berlin et al. |
| 2003/0034117 A1 | 2/2003 | Thomas et al. |
| 2003/0091811 A1 | 5/2003 | Skrzyniarz et al. |
| 2004/0005100 A1 | 1/2004 | Versluys |
| 2004/0033343 A1 | 2/2004 | Comeau et al. |
| 2004/0065539 A1 | 4/2004 | Sosnowski |
| 2004/0191438 A1 | 9/2004 | Cosentino et al. |
| 2005/0067095 A1 | 3/2005 | Hasenoehrl et al. |
| 2005/0152624 A1 | 7/2005 | Versluys |
| 2005/0163974 A1 | 7/2005 | Geeroms |
| 2007/0009723 A1 | 1/2007 | Ogawa et al. |
| 2007/0155859 A1 | 7/2007 | Song et al. |
| 2007/0224149 A1 | 9/2007 | Suzuki et al. |
| 2007/0224395 A1 | 9/2007 | Rowitsch et al. |
| 2007/0228134 A1 | 10/2007 | Cook et al. |
| 2007/0287776 A1 | 12/2007 | Nordin et al. |
| 2008/0017338 A1 | 1/2008 | Nordin et al. |
| 2008/0055380 A1 | 3/2008 | Regan et al. |
| 2008/0118693 A1 | 5/2008 | Bilski et al. |
| 2009/0280322 A1 | 11/2009 | Daniels et al. |
| 2009/0306255 A1 | 12/2009 | Patel et al. |
| 2009/0321508 A1 | 12/2009 | Fu et al. |
| 2010/0012712 A1 | 1/2010 | Swoboda et al. |
| 2010/0044907 A1 | 2/2010 | Burke et al. |
| 2010/0068544 A1 | 3/2010 | Huang et al. |
| 2010/0119741 A1 | 5/2010 | Cimecioglu et al. |
| 2010/0136269 A1 | 6/2010 | Andersen et al. |
| 2010/0139878 A1 | 6/2010 | Nicolucci |
| 2010/0181015 A1 | 7/2010 | Kohler |
| 2011/0019121 A1 | 1/2011 | Mo et al. |
| 2011/0033398 A1 | 2/2011 | Gauvin et al. |
| 2011/0064926 A1 | 3/2011 | Babinsky et al. |
| 2011/0248076 A1 | 10/2011 | Bentmar et al. |
| 2012/0015162 A1 | 1/2012 | Lion et al. |
| 2012/0043373 A1 | 2/2012 | Babinsky et al. |
| 2012/0048450 A1 | 3/2012 | Fu et al. |
| 2012/0100289 A1 | 4/2012 | Egan et al. |
| 2013/0160945 A1 | 6/2013 | Huang et al. |
| 2013/0303351 A1 | 11/2013 | Fu et al. |
| 2014/0004563 A1 | 1/2014 | Paripati et al. |
| 2014/0087109 A1 | 3/2014 | Huang et al. |
| 2014/0087177 A1 | 3/2014 | Huang et al. |
| 2014/0131367 A1 | 5/2014 | Bordary et al. |
| 2014/0154492 A1 | 6/2014 | Traser et al. |
| 2014/0243442 A1 | 8/2014 | Coles et al. |
| 2015/0322301 A1 | 11/2015 | Ellis et al. |
| 2016/0050722 A1 | 2/2016 | Fu et al. |
| 2016/0194828 A1 | 7/2016 | Chang |
| 2016/0221233 A1 | 8/2016 | Kiiskinen et al. |
| 2016/0263876 A1 | 9/2016 | Huang et al. |
| 2017/0130058 A1 | 5/2017 | Huang et al. |
| 2017/0130399 A1 | 5/2017 | Huang et al. |
| 2017/0341847 A1 | 11/2017 | Chase et al. |
| 2017/0361573 A1 | 12/2017 | Malmgren et al. |
| 2018/0072032 A1 | 3/2018 | Huang et al. |
| 2018/0148246 A1 | 5/2018 | Fu et al. |
| 2019/0031415 A1 | 1/2019 | Kumar |
| 2019/0062028 A1 | 2/2019 | Getty et al. |
| 2019/0106263 A1 | 4/2019 | Fu et al. |
| 2019/0136456 A1 | 5/2019 | Huang et al. |
| 2019/0152183 A1 | 5/2019 | Fu et al. |
| 2019/0161915 A1 | 5/2019 | Swails et al. |
| 2019/0218429 A1 | 7/2019 | Thompson et al. |
| 2019/0218720 A1 | 7/2019 | Huang et al. |
| 2019/0284438 A1 | 9/2019 | Mcleod et al. |
| 2020/0247105 A1 | 8/2020 | Getty et al. |
| 2021/0214581 A1 | 7/2021 | Mcleod et al. |
| 2022/0073787 A1 | 3/2022 | Mcleod et al. |

FOREIGN PATENT DOCUMENTS

| CA | 2145938 A1 | 10/1995 |
|---|---|---|
| CN | 1354085 A | 6/2002 |
| CN | 1449913 A | 10/2003 |
| CN | 1643100 A | 7/2005 |
| CN | 101045803 A | 10/2007 |
| CN | 101263184 A | 9/2008 |
| CN | 101476265 A | 7/2009 |
| CN | 103079791 A | 5/2013 |
| CN | 103189460 A | 7/2013 |
| CN | 103717690 A | 4/2014 |
| CN | 103739868 A | 4/2014 |
| CN | 103772749 A | 5/2014 |
| CN | 104685125 A | 6/2015 |
| CN | 105765023 A | 7/2016 |
| CN | 110892013 A | 3/2020 |
| DE | 3685819 T2 | 1/1993 |
| DE | 60107070 T2 | 11/2005 |
| DE | 202011109020 U1 | 1/2012 |
| EP | 0526396 A1 | 2/1993 |
| EP | 0890625 A1 | 1/1999 |
| EP | 0804331 A4 | 3/2000 |
| EP | 1142801 A1 | 10/2001 |
| EP | 1216146 B1 | 10/2005 |
| EP | 1634897 A2 | 3/2006 |
| EP | 1669490 A1 | 6/2006 |
| EP | 1674543 A1 | 6/2006 |
| EP | 1780250 A1 | 5/2007 |
| EP | 2611588 A2 | 7/2013 |
| EP | 2614124 A2 | 7/2013 |
| EP | 3215674 A1 | 9/2017 |
| GB | 1486328 A | 9/1977 |
| GB | 2303630 A | 2/1997 |
| IT | VE990023 A1 | 11/2000 |
| JP | S5085483 A | 7/1975 |
| JP | S6144965 A | 3/1986 |
| JP | H05208597 A | 8/1993 |
| JP | H05239423 A | 9/1993 |
| JP | S06144965 A | 5/1994 |
| JP | H06313163 A | 11/1994 |
| JP | H08175576 A | 7/1996 |
| JP | H09164621 A | 6/1997 |
| JP | H09217050 A | 8/1997 |

(56)  References Cited

FOREIGN PATENT DOCUMENTS

| | | | |
|---|---|---|---|
| JP | S63146945 | A | 6/1998 |
| JP | H10329297 | A | 12/1998 |
| JP | 2000006285 | A * | 1/2000 |
| JP | 2000159268 | A | 6/2000 |
| JP | 2001191436 | A | 7/2001 |
| JP | 2001207146 | A | 7/2001 |
| JP | 2001323094 | A | 11/2001 |
| JP | 2002241450 | A | 8/2002 |
| JP | 2003072854 | A | 3/2003 |
| JP | 2003154589 | A | 5/2003 |
| JP | 2004511616 | A | 4/2004 |
| JP | 2005029603 | A | 2/2005 |
| JP | 2005097816 | A | 4/2005 |
| JP | 2006517238 | A | 7/2006 |
| JP | 2009179894 | A | 8/2009 |
| JP | 2010202996 | A | 9/2010 |
| JP | 2013067070 | A | 4/2013 |
| JP | 2014024583 | A | 2/2014 |
| JP | 2015524856 | A | 8/2015 |
| JP | 2015196773 | A | 11/2015 |
| JP | 2017039523 | A | 2/2017 |
| JP | 2017524776 | A | 8/2017 |
| KR | 20140090995 | A | 7/2014 |
| KR | 20160090800 | A | 8/2016 |
| KR | 20170065618 | A | 6/2017 |
| RU | 2216495 | C2 | 11/2003 |
| RU | 2252825 | C2 | 5/2005 |
| RU | 2011129597 | A | 1/2013 |
| RU | 2519451 | C2 | 6/2014 |
| RU | 2015135327 | A | 3/2017 |
| WO | 9014223 | A1 | 11/1990 |
| WO | 9633923 | A1 | 10/1996 |
| WO | 9854004 | A1 | 12/1998 |
| WO | 0069747 | A1 | 11/2000 |
| WO | 0110635 | A2 | 2/2001 |
| WO | 0154828 | A1 | 8/2001 |
| WO | 0154988 | A2 | 8/2001 |
| WO | 200162986 | A1 | 8/2001 |
| WO | 0200800 | A2 | 1/2002 |
| WO | 0231077 | A2 | 4/2002 |
| WO | 2005110737 | A1 | 11/2005 |
| WO | 2007091961 | A1 | 8/2007 |
| WO | 2007126783 | A1 | 11/2007 |
| WO | 2007135451 | A1 | 11/2007 |
| WO | 2007142593 | A1 | 12/2007 |
| WO | 2008084372 | A1 | 7/2008 |
| WO | 2010069451 | A1 | 6/2010 |
| WO | 2010129493 | A1 | 11/2010 |
| WO | 2012030596 | A2 | 3/2012 |
| WO | 20120033998 | A2 | 3/2012 |
| WO | 2013192572 | A1 | 12/2013 |
| WO | 2014015060 | A2 | 1/2014 |
| WO | 2014051876 | A1 | 4/2014 |
| WO | 2015036901 | A1 | 3/2015 |
| WO | 2015066806 | A1 | 5/2015 |
| WO | 2015081097 | A1 | 6/2015 |
| WO | 2016014486 | A1 | 1/2016 |
| WO | 2019018523 | A1 | 1/2019 |
| WO | 2019040624 | A1 | 2/2019 |

OTHER PUBLICATIONS

Bermesheva, E.V. "Zavisimost mezhdu vyazkouprugimi I adgezivnymi svoistvami polimernykh adgezivov. Dopolneni kriteriya liplosti Dalkkuista", 25 Sipozium Po Reologii, G.Ostashkov, Sep. 5-10, 2010, pp. 61-62.

Popil, Roman E. et al. "Adhesive level effect on corrugated board strength—experiment and FE modeling. " Abstract submitted for the 2007 International Progress in Paper Physics Seminars, pp. 1-6.

Radio Frequency (RF) vs. Microwave (MW). Retrieved from http://www.stalam.com/en/technologies/radio-frequency-and-m icro-wawes. htm l.

NXP, FTF 2016 Technology Forum, "Advantages of Solid State RF Power Over Vacuum Tubes in Industrial Applications", May 18, 2016. (Year: 2016).

International Search Report and Written Opinion, International Application No. PCT/US2018/047526, dated Jan. 18, 2019.

European Search Results Under Rule 164(2)(b) EPC EP 18769557 Completed: May 27, 2021; Mailing Date: Jun. 2, 2021 7 Pages.

https://www.vttresearch.com/en/ourservices/foam-forming-platform.

Skylighter, "Kraft Paper Weights and Thickness Comparison Chart", Feb. 14, 2018. (Year: 2018).

https://cris.vtt.fi/en/publications/foam-forming-technology-enables-new-possibilities-for-paper-indus.

Industrial Pharmaceutics, Editor-in-chief: Rongfeng Hu, Beijing: China Press of Traditional Chinese Medicine, Aug. 2010, p. 396., China Press of Traditional Chinese Medicine.

Xiu H, Yang X. Effect of Amylopectin Dosage on the Structure and Properties of Plant Fibers Based Foam Material. China Pulp & Paper. 2019;38(8):34.

Resyn® 1072 Technical Data Sheet, Celanese , Apr. 15, 2022, 2 pages.

Yao, Zhiguang et al. Polymer Chemistry, Jan. 2013, p. 212.

* cited by examiner

DIELECTRIC HEATING OF FOAMABLE COMPOSITIONS

FIELD OF THE INVENTION

The present invention relates to dielectrically heating a foamable composition. In particular, radio frequency (RF) heating is used to heat the foamable composition to provide insulation in the manufacture of an article.

BACKGROUND OF THE INVENTION

A more environmentally-sound disposable food packages and containers are sought after than traditional closed-cell extruded polystyrene foam packages. Packages made entirely out of plastic typically do not biodegrade in less than 400 years, or if ever, and some regulations have banned the use of such packages and containers.

Alternative packages that are recyclable biodegradable and/or compostable are in demand. One such package includes cellulose-based substrates, sourced from renewal materials that can be recycled and/or compostable. The package is made by joining two cellulosic substrates with an air gap interposed in between the two. Some drawbacks to these alternative packages include low insulation and poor structural integrity over the plastic packages. As the package is handled and flexed, the air gap between the two substrates become compressed and the insulation is decreased in those compressed areas. Insulation can be improved by increasing the air gap between the cellulose substrate layers, increasing the thickness of the cellulose substrates or inserting a cellulose medium in between the two layers.

Some of the above mentioned improved packages are described in U.S. Pat. Nos. 9,580,629, 8,747,603, 9,273,230, 9,657,200, US 20140087109, US 20170130399, US 20170130058, and US 20160263876. The packages are formed with an air gap in the coating/adhesive sandwiched between two substrates, which provides insulation. Conventional heating requires prolonged time and large space for water evaporation and curing/coalescing the polymer. Moreover, as the size of the packages vary, the insulative gap is not always uniform. While microwave heating provides strict controls for level of moisture and uniform air gaps, the depth of penetration is limited only to about 1.5 inches. Thus, any substrate that has a thickness greater than about 1.5 inches may result in non-uniform packages.

There is a need in the art for methods to provide uniform insulation for all sizes of packages. The present invention provides methods to produce environmentally and economically sound package that provides uniform thermal insulation for various sizes of packages.

SUMMARY OF THE INVENTION

The present invention relates to methods for foaming and coalescing a microsphere-filled, waterborne composition.

One embodiment is directed to a method for foaming and coalescing a composition comprising:

(a) preparing the composition comprising (i) a water-based polymer, (ii) a plurality of expandable microspheres having an initial expandable temperature range of from about 80° C. to about 110° C., and a maximum expandable temperature range of from about 50° C. to about 150° C.; and (iii) optionally, an additive; and (b) exposing the composition to a dielectric heating; whereby the plurality of expandable microspheres in the composition expands and the composition coalesces.

Another embodiment is directed to a process for forming an article comprising the steps of:

(a) preparing a composition comprising (i) a water-based polymer, (ii) a plurality of expandable microspheres having an initial expandable temperature range of from about 80° C. to about 110° C., and a maximum expandable temperature range of from about 50° C. to about 150° C.; and (iii) optionally, an additive;

(b) applying the composition onto a first substrate;

(c) applying a second substrate onto the composition, thereby forming the article wherein the composition is sandwiched between the two substrates;

(d) applying a dielectric heating to the article; whereby the plurality of expandable microspheres in the composition expands and the composition coalesces.

The dielectric heating provides uniform heating throughout the composition and forms substantially a uniform thickness of air gap throughout the composition and article.

DETAILED DESCRIPTION OF THE INVENTION

Figure 1A:
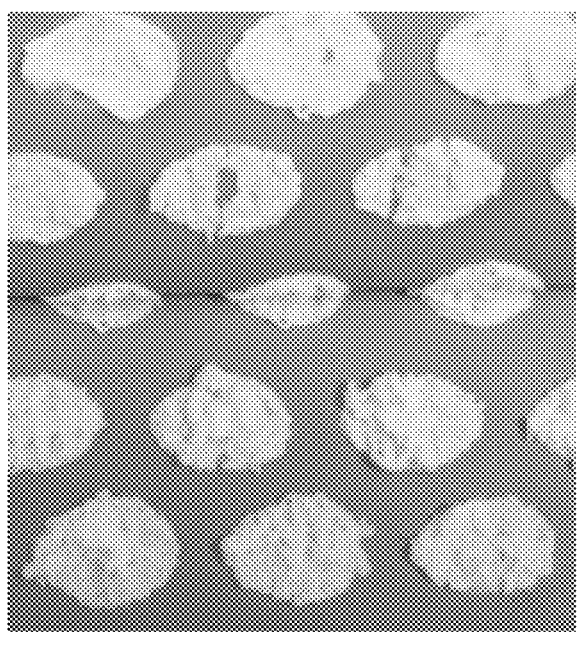
FIG. 1A shows a photograph of microsphere filled composition activated by RF dielectric heating immediately after expansion of the microspheres.

The present invention provides a method for foaming a plurality of microspheres and coalescing and locking in the foamed microspheres a waterborne composition. The waterborne composition comprises a polymer and a plurality of microspheres, and is applied onto a cellulosic substrate(s) to form a package. Once expanded and locked in place, the air gap in the foamed microspheres provides insulation and structural integrity to the package. This package is more environmentally sound than traditional extruded polystyrene foam packages.

Conventional heating requires ovens with long belts that require large space and massive heat output. Temperatures ranges of about 212° F. (100° C.) to about 450° F. (177° C.) is typically used in conventional heaters.

Microwave heating is another method. Microwave heating provides uniformity in drying and moisture control, and can control the moisture to about 1%. Microwave energy, however, dissipates and cannot penetrate a depth greater than about 1.5 inches (4 cm). Moreover, microwave is a known radiation hazard and exposure to such harmful radiation should be minimized workers. To minimize health risks, industrial microwave machines typically have small openings, and thus, fitting large and odd shape containers into the small orifice is challenging.

Dielectric heating, electronic heating, radio frequency (RF) heating, and high-frequency heating, all interchangeably used herein, is the process in which high-frequency alternating electric field or radio wave heats a dielectric material. RF heating is distinguishable from microwave heating. Industrial radio frequencies operate between approximately 2 MHz and 300 MHz with typical wavelengths of about 141 to about 24 feet (43 to 7.3 meters). Industrial microwave systems use frequencies over 300 MHz with typical wavelengths of about 13 to about 5 inches (33 and 12 cm). The efficiency of power utilization is far lower in an RF generator than a microwave unit, and thus, microwave unit is often the preferred source of heating.

The present invention provides dielectric heating, particularly RF heating, a foamable waterborne composition. RF creates an alternating electric field between a dielectric material, in this invention, polar water molecules. The article is conveyed between the electrodes causing the water molecules in the composition to continuously reorient to face opposite electrodes. Friction from this molecular movement causes the rapid heating. RF operates at much lower frequency than microwave heating, and is associated with lower health risks than microwaves. RF is also suitable for heating bulkier and odd-shaped containers due to its higher depth of penetration.

In addition, the inventive process may include a combination of dielectric heating and direct heating applications. For example, expansion of the microspheres may be achieved through dielectric heating, while the removal of excess moisture after expansion may be achieved through direct heat.

RF heating a composition comprising a water-based polymer and a plurality of expandable microspheres provides uniform heating and drying of the water and expanded microspheres.

The present invention is also based on the discovery that RF heating the composition, comprising a water-based polymer and a plurality of expandable microspheres, applied on an article provides improved and uniform thermal insulation for the article.

One embodiment is directed to a method for foaming and coalescing a composition comprising:

(a) preparing the composition comprising (i) a water-based polymer, (ii) a plurality of expandable microspheres having an initial expandable temperature range of from about 80° C. to about 110° C., and a maximum expandable temperature range of from about 50° C. to about 150° C.; and (iii) optionally, an additive; and (b) exposing the composition to a dielectric heating;

whereby the plurality of expandable microspheres in the composition expands and the composition coalesces.

The RF heating concurrently drives the water away from the composition to coalesce the water-based polymer and expands the microspheres as the temperature reaches the activation state of the microspheres. Heating at RF frequencies of about 14, 27 and 41 MHz, are particularly preferred. The RF devices can be designed with operational amplifiers for optimal heating.

The compositions described herein may be useful in multilayer substrates, particularly for cellulosic substrates. Using the composition, a greater insulation space may be provided between the two substrates, which it is attached at the point of adhesion. The insulating products useful herein include paper products for consumer use, such as for hot drinking cups and lids, cold drinking cups and lids, hot food containers and lids, cold food containers and lids, freezer cartons and cases, envelopes, bags, and the like.

The composition may be formed as an adhesive or as a coating, herein used interchangeably. The composition is prepared by forming a mixture of a water-based polymer, a plurality of expandable microspheres and optionally, additive.

The water-based polymer is prepared by emulsion polymerization, and may be a single grade or a mixture of synthetic emulsion polymer or polymers of a natural origin. The water-based polymer prepared by emulsion polymerization may include any desired polymer components, including starch, vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinylacrylic, styrene acrylic, acrylic, styrene butyl rubber, polyurethane, starch and mixtures thereof. Particularly preferred emulsion polymer components are vinyl acetate ethylene dispersion, polyvinyl acetate and starch. Preferably, the emulsion polymer is stabilized by hydrophilic protective colloids.

The water-based polymer may be present in the composition in any amount, and desirably is present in an amount of from about 60% to about 99.5 wt %, preferably from about 65% to about 95 wt %, by weight of the composition prior to setting of the composition. Depending on the emulsion polymer, the solid levels vary from about 40 wt % to about 65 wt %, based on the emulsion polymer.

The expandable microspheres useful in the present invention can expand in size in the presence of heat and/or RF radiation. The microspheres useful in the present invention include, for example, heat expandable polymeric microspheres, including those having a hydrocarbon core and a polyacrylonitrile shell (such as those sold under the trade name DUALITE®) and other similar microspheres (such as those sold under the trade name EXPANCEL®). The expandable microspheres may have any unexpanded size, including from about 5 microns to about 30 microns in diameter. In the presence of heat or radiation, the expandable microspheres of the present invention can increase in diameter by about 3 times to about 10 times the original size. Upon expansion of the microspheres in the composition, the composition becomes a foam-like material, which has improved insulation properties. The microspheres are typically made of plastic or polymeric shells and a blowing agent is inside the shell, designed to activate upon reaching specific temperatures.

The expandable microspheres have a particular temperature at which they begin to expand and a second temperature at which they have reached maximum expansion. Microsphere grades are typically sold with specific expansion (Texp) temperatures and maximum expansion temperatures (Tmax). The initial expansion temperature (Texp) is the typical temperature at which the microspheres start to expand (Texp), and the maximum expansion temperature (Tmax) is the temperature at which the about 80% of the microspheres have expanded. If the microspheres are exposed to temperature far greater than Tmax, the microspheres start to explode and deflate.

One particularly useful microsphere has a Texp of about 80° C. to about 105° C. The temperature at which the microspheres have reached maximum expansion (Tmax) is desirably from about 90° C. to about 140° C.

The choice of the particular microspheres and their respective Texp and Tmax is critical to the invention. While any particular grade of microspheres may be used in the present invention, the Texp and Tmax of the microspheres should be taken into account when formulating and activating in RF conditions. The RF radiation evaporates the water from the composition, but the temperature of the composition is limited to about less than about 100° C. Supercritical heating can occur during the RF heating if additives and/or salts are present in the composition, pushing the temperature up to above 100° C. However, the preferable Texp and Tmax of the expandable microspheres are less than about 100° C. and less than about 140° C., respectively. Microspheres with higher temperatures will not activate during the RF heating. Once the composition coalesces, the microspheres are substantially locked in place, making expansion thereof difficult, if not impossible. Surprisingly, the RF heating allows for a more robust expansion of the microspheres. The use of the RF activation allows for a self-limiting of microsphere expansion, and less explosion and deflation when compared to conventional convection heating.

In preferred embodiments, it is desirable that the expandable microspheres be present in the composition in an amount of from about 0.1% to about 70% by weight of the composition prior to setting of the composition, and more desirably from about 0.5% to about 60% by weight of the composition prior to setting of the composition, and most desirably at about 1% to about 50% by weight of the composition prior to setting of the composition. The expansion ratio of the expandable microspheres and the loading level of the microspheres will be related to each other.

Depending on the amount of the microspheres and the type of the polymer, the coalesced composition can have adhesive properties. High levels of micropsheres will lead to lower or no adhesive property, whereas low levels, about less than about 30 wt % based on the total weight of the composition, will lead to adhesive property of the composition.

Depending on the fully expanded size of the microspheres, the amount of the expandable microspheres in the composition can be adjusted. Depending upon the particular expandable microspheres used in the composition, the desired amount of the microspheres in the composition may be modified.

The microspheres further increase the structural integrity of the coalesced composition after they are expanded. While introducing voids in a matrix typically decrease mechanical integrity, the microspheres in the polymeric matrix provide stiffness when applied onto substrates. This is particularly useful for packaging fragile contents.

In another embodiment, the microsphere may be preexpanded. If pre-expanded microspheres are added in the composition, the pre-expanded microspheres should be chosen so the RF heating will not start to decompose the microspheres. Yet in another embodiment, the microspheres may be a mixture of pre-expanded and expandable microspheres.

The composition optionally further includes any plasticizers, tackifiers, humectants, accelerators, fillers, pigments, dyes, stabilizers, rheology modifiers, polyvinyl alcohols, preservatives, e.g., antioxidant, biocide; and mixtures thereof. These components can be included in an amount of from about 0.05% to about 15% by weight of the composition.

Exemplary plasticizers are dibenzoates available as BENZOFLEX®, such as diethylene glycol dibenzoate, dipropylene glycol dibenzoate, and the like.

The accelerator is a multivalent cation from water-soluble salts, including commonly available aluminum nitrate (Al $(NO_3)_3$), zirconium acetate, ammonium zirconyl carbonate (available as Bacote 20 from Zirconium Chemicals). The addition of the multivalent water-soluble salt shortens the time required for radiation during the expansion of the composition. When added, from about 0.05 to about 1, preferably from about 0.1 to 0.3 wt % based on the total weight of the composition, may be used.

Exemplary preservatives include 1,2-benzisothiazolin-3-one, 5-chloro-2-methyl-4-isothiazolin-3-one and 2-Methyl-4-isothiazolin-3-one. Typically, preservatives may be used in an amount of from about 0.05% to about 0.5% by weight of the composition prior to setting of the composition.

Exemplary fillers include pearl starch, physically modified starch, and chemically modified starch.

Other materials that do not adversely affect the composition and insulating properties of the composition may be used as desired. Other additives and/or salts may be included in the composition to increase the coalescence of the composition, is desired.

Although the composition can start to coalesce at room temperature, the high moisture content and will be substantially fluid until the moisture content is about 20, 19, 18, 17, 16, 15, 14, 13, 12, 11, 10, 9, 8, 7, 6, 5, 4, 3, 2 or 1 wt %, based on the total weight. Preferably, the moisture content should be maintained at levels greater than about 20 wt % to prevent premature coalescence. Premature coalescence can lead to uneven drying, leading to uneven thickness of the dried composition on substrates.

RF heating also allows for fast throughput of making articles. The composition must be designed to accommodate this fast throughput method to maximize solid contents in the composition. It is preferable that the water molecules to be efficiently driven off without leaving unsightly wrinkles or unevenness on the substrates.

Surprisingly, RF heating provides a uniform and even activation of microspheres and faster egress of water from the composition, at a faster throughput. The uniform and evenness of the coalesced coating provides uniform thermal insulation to the article and minimizes unsightly wrinkles on the substrates, while increasing the production.

Another embodiment is directed to a process for forming an article comprising the steps of:

(a) preparing the composition comprising (i) a water-based polymer, (ii) a plurality of expandable microspheres having an initial expandable temperature range of from about 80° C. to about 110° C., and a maximum expandable temperature range of from about 50° C. to about 150° C.; and (iii) optionally, an additive;

(b) applying the composition onto a first substrate;

(c) applying a second substrate onto the composition, thereby forming the article wherein the composition is sandwiched between the two substrates;

(d) applying a dielectric heating to the article;

whereby the plurality of expandable microspheres in the composition expands and the composition coalesces.

The articles are suitable as protective packages, shipping packages, impact resistant packages, and insulative packages. The packages include cups, food containers, cases, cartons, bags, lids, boxes, envelopes, shipping bags, wraps, clamshells, and the like.

The substrates include fibreboards, chipboards, corrugated boards, corrugated mediums, solid bleached boards (SBB), solid bleached sulphite boards (SBS), solid unbleached board (SLB), white lined chipboards (WLC), kraft papers, kraft boards, coated papers and binder boards.

The composition may be applied to the first substrate in any configuration desired, including in a series of dots, stripes, waves, checkerboard patterns, any general polyhedron shapes that have substantially flat bases, and combinations thereof. Further, the composition may be applied to the first surface in a series of cylinders. In addition, if desired, the composition may be applied to the first surface as a substantially flat sheet, covering the entire first surface (full lamination) or covering a portion of the first surface. A second substrate applied to the top surface of the composition, forming a sandwiched configuration of: first substrate—composition with expandable microspheres—second substrate.

Yet in another embodiment, the insulated article comprises a substantially flat substrate and a non-flat, rounded substrate. The composition is applied either to the substantially flat substrate, the non-flat substrate, or to both substrates, to form the insulated article. The composition may be applied to completely coat the surface of the substrate(s) or to selectively coat portions of the surface of the substrate(s). The pattern can be random or various ordered designs. The resulting article thus has an insulating space between the liner surfaces. The articles with patterned composition mimic a divider interposed between the two substrates. The space between the two substrates are generated and maintained by the expanded microspheres.

Optionally, a different adhesive may be applied in between the two substrates. This is especially useful to bind the two substrates together if the composition has low or no adhesive properties. The different adhesive may be applied before, concurrently or after the composition is applied onto the first substrate. In another embodiment, the different adhesive may be applied on the second substrate, and the two substrates are joined together with the composition, and the different adhesive sandwiched between the two substrates. Exemplary different adhesive includes hot melt adhesive, pressure sensitive adhesive, waterborne adhesive, and solvent-based adhesives.

The wet composition is applied in between the two substrates to form an article, and then exposed to dielectric heating to coalesce the composition and to expand the microspheres. The heating therefore locks in the components, including the plurality of expanded microspheres, in place to the surface of the substrates. The dielectric heating creates an alternating electric field between the polar water molecule and causes rapid heating. With the presence of water, the temperature rises to 100° C., and the water is evaporated away while the microspheres expand. The microsphere grades with a Texp of about 80° C. to about 100° C. and Tmax of about 90° C. to about 140° C. expands with the dielectric heating.

The use of dielectric heating, particularly RF heating, allows rapid processing. Therefore, the RF process allows for fast throughput, and smaller area is warranted than convection heating process. Moreover, bulkier and odd-shaped packages can be manufactured with RF processing since the depth of penetration is higher and the oven aperture is more flexible than microwave ovens.

Multilayer substrate packages formed with the composition containing microspheres improve the ability of the package to withstand strain under a constant stress at elevated and/or reduced temperatures. It is expected to those skilled in the art that the strain of the composition increases with the addition of microspheres at elevated temperature.

The present invention may be better understood through analysis of the following examples, which are non-limiting and are intended only to help explain the invention.

EXAMPLES

Example 1—Water-Based Polymers

TABLE 1

| Resin Emulsion | Water-based Polymer Name | Emulsion Polymer | Solids content | pH |
|---|---|---|---|---|
| 1 | Dur-O-Set C-325 | PVAc | 54-58% | 4.5-6.0 |
| 2 | Resyn 1072 | PVAc | 62-67% | 3.5-5.5 |
| 3 | Dur-O-Set E-200 | EVA | 53-59% | 4.0-5.0 |

Example 2—Compositions

The compositions were prepared with the following components. Each resin emulsion was used to make the following compositions.

TABLE 2

| Composition | A (%) | 1 (%) | 2 (%) | 3 (%) | 4 (%) | 5 (%) |
|---|---|---|---|---|---|---|
| Resin emulsion | 91.4 | 87.4 | 89.4 | 86.4 | 85.4 | 83.4 |
| Expandable microspheres* | 0 | 4.0 | 4.0 | 6.0 | 8.0 | 8.0 |
| Benzoflex K88, Eastman | 4.0 | 4.0 | 4.0 | 4.0 | 4.0 | 4.0 |
| NaCl, Aldrich | 2.0 | 2.0 | 0 | 1.0 | 0 | 2.0 |
| Glycerine, Aldrich | 2.4 | 2.4 | 2.4 | 2.4 | 2.4 | 2.4 |
| Methocel K4M, Colorcon | 0.1 | 0.1 | 0.1 | 0.1 | 0.1 | 0.1 |
| Kathon, Dow Chemical | 0.1 | 0.1 | 0.1 | 0.1 | 0.1 | 0.1 |

*Texp 80° C., Tmax 135° C., median particle size 15.2 μm, blowing agent Isobutane (10-20% Concentration), density ≤10 kg/m$^3$ Each composition was made by mixing the components in a vessel.

Example 3—Activation

Composition 4 with Resin Emulsion 3 composition, in its wet state, was applied on a paper substrates (20 and 24 lb paper, Golden Kraft) in a series of dot pattern. Each substrate was activated with convention heating, microwave or RF dielectric heating (40 MHz and 55-62 Amps). The initial height of the coating and the final height after activation were recorded in Table 3. Percent wetness immediately after activation was visually measured by calculating the amount the non-expanded segments of the coatings.

TABLE 3

| Activation | RF dielectric | Convection | Microwave |
|---|---|---|---|
| Initial thickness | 0.023 inch | 0.025 inch | 0.021 inch |
| time in heating unit | 7 seconds | 7 seconds | 7 seconds |
| Final height | 0.1-0.12 inch | 0.03-0.045 inch | 0.03-0.08 inch |
| % Increase | 77-81% | 16-44% | 30-74% |
| % Wet Immediately After | 0-15% | 80-90% | 60-90% |
| Comments | Expansion throughout all expandable adhesive locations relatively even throughout. | No to low expansion with drying of adhesive and slight expansion on edges of glue locations. Large amount of fiber tear | No to low expansion with random expansion within glue locations |
| Opened Immediately After Expansion | FIG. 1A | FIG. 2A | FIG. 3A |
| Fully dried After Expansion | FIG. 1B | FIG. 2B | FIG. 3B |

Activation with RF had superior percent increase in microsphere expansion and evenness than the other two heating methods. Also, RF heating provided much faster drying, as the percent wetness was significantly lower than convection and microwave heating.

Figure 1B:
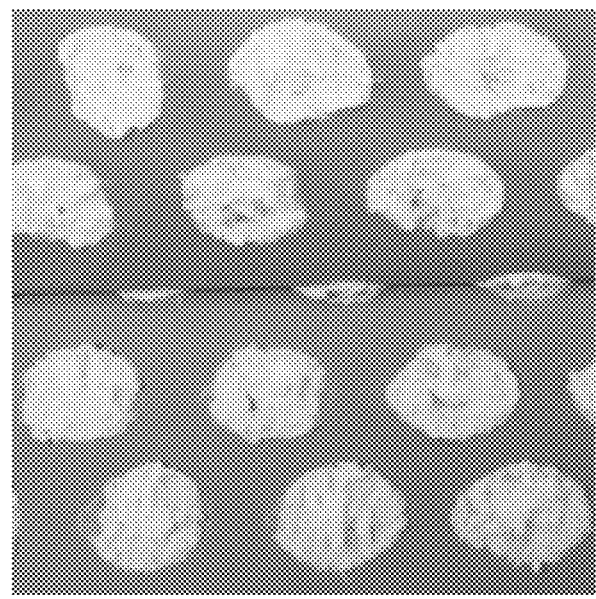
FIG. 1B shows a photograph of microsphere filled composition activated by RF dielectric heating after fully drying the composition.
Figure 2A:
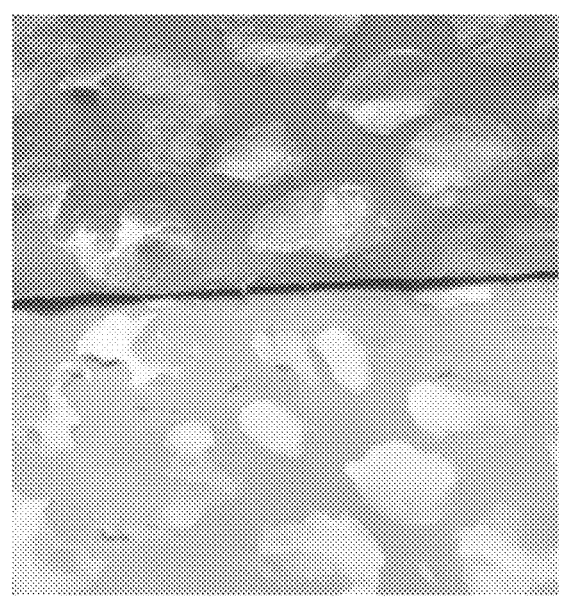
FIG. 2A shows a photograph of microsphere filled composition activated by convection heating immediately after expansion of the microspheres.
Figure 2B:
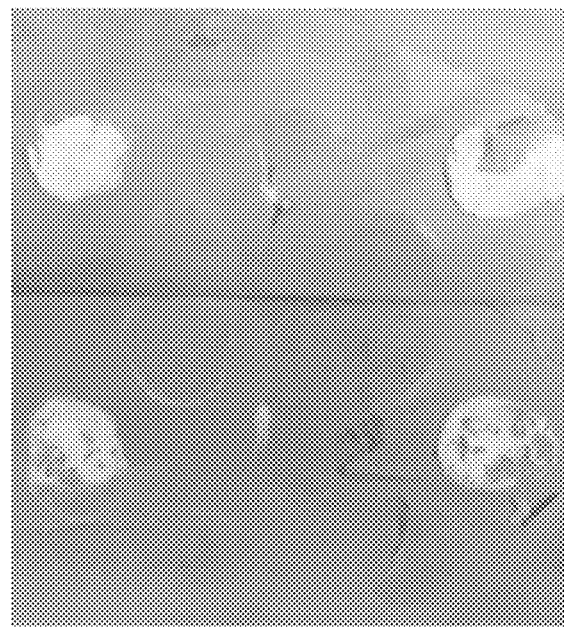
FIG. 2B shows a photograph of microsphere filled composition activated by convection heating after fully drying the composition.
Figure 3A:
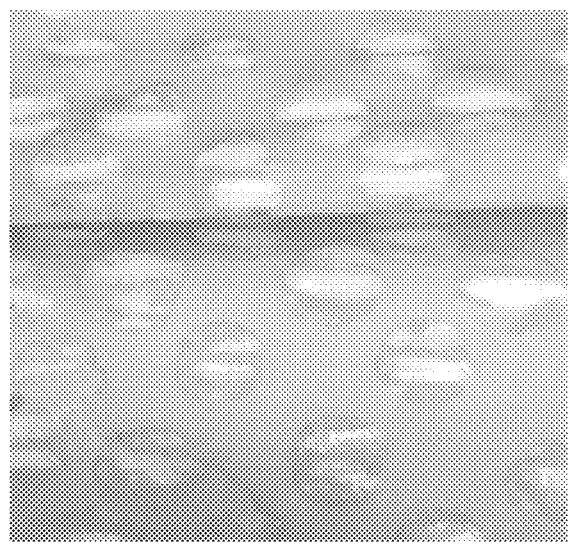
FIG. 3A shows a photograph of microsphere filled composition activated by microwave heating immediately after expansion of the microspheres.
Figure 3B:
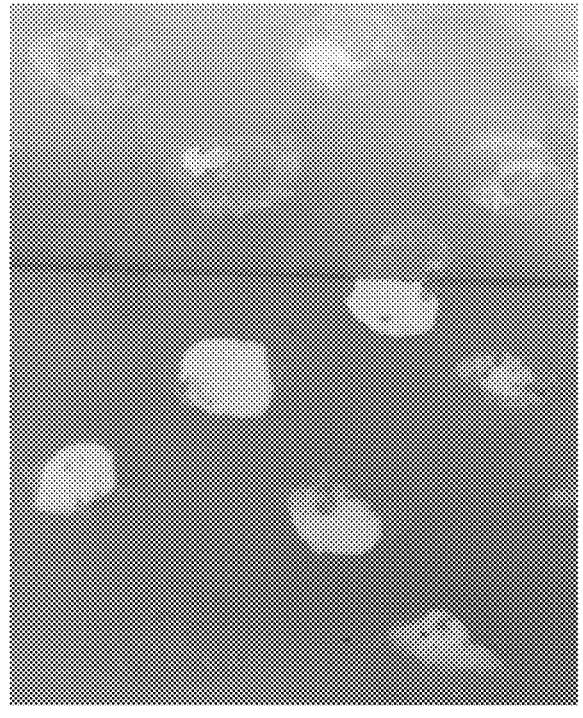
FIG. 3B shows a photograph of microsphere filled composition activated by microwave heating after fully drying the composition.

The photographs the activated composition on paper are shown in FIGS. 1-3. RF heating, as shown in FIGS. 1A and 1B, provided consistent and even expansion, whereas convection (FIGS. 2A and 2B) and microwave (FIGS. 3A and 3B) heatings did not provide consistent expansion of the composition.

Example 4—Solids Content

To understand the speed throughput, a package was formed by coating Composition 4 (Resin Emulsion 3) on a first substrate and a second substrate was placed atop of the first substrate. The package was then left outside in ambient temperature (ranging from about 72° F. to about 90° F.) for less than 1, 2 or 5 minutes before activating with RF at 40 MHz and 55-62 Amps.

Figure 4A:
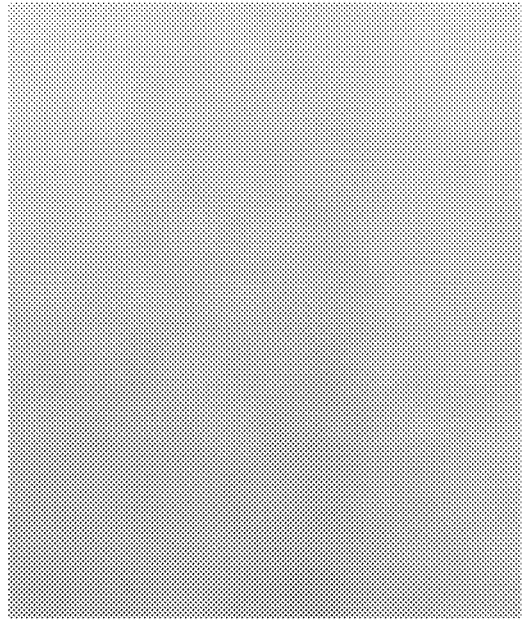
FIG. 4A shows a photograph of package activated by RF after drying under 1 minute at ambient temperature.
Figure 4B:
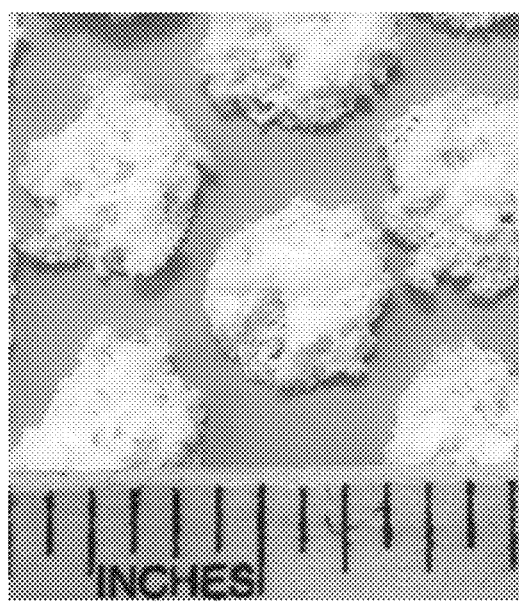
FIG. 4B shows a photograph of adhesive on substrate activated by RF after drying under 1 minute at ambient temperature.
Figure 5A:
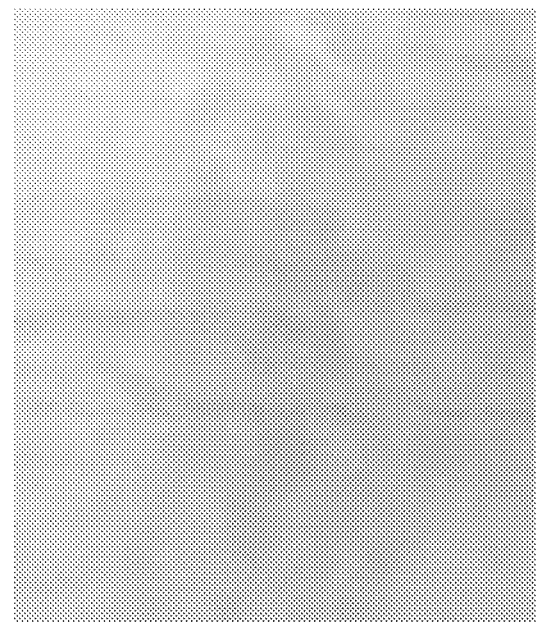
FIG. 5A shows a photograph of package activated by RF after drying for 2 minute at ambient temperature.
Figure 5B:
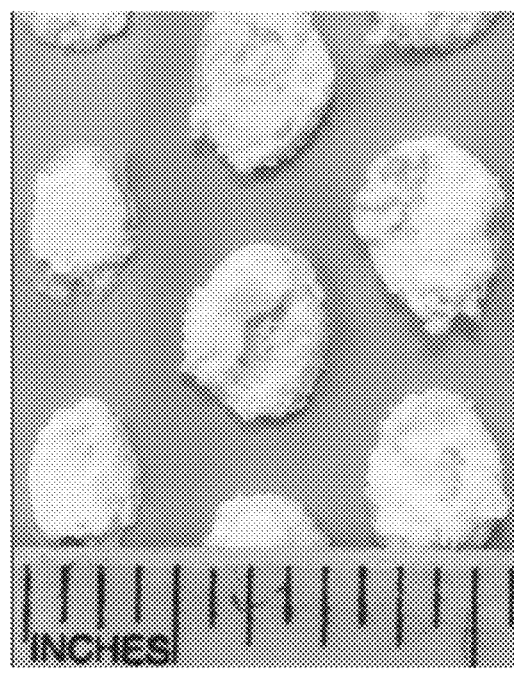
FIG. 5B shows a photograph of adhesive on substrate activated by RF after drying for 2 minute at ambient temperature.
Figure 6A:
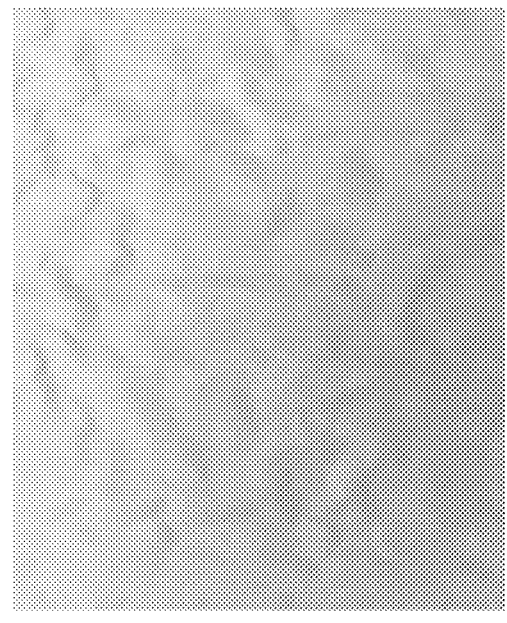
FIG. 6A shows a photograph of package activated by RF after drying for 5 minute at ambient temperature.

The package appearance on the reverse side of the coated substrate are shown in FIGS. 4A, 5A and 6A. Two substrates were pulled apart and are photographed in FIGS. 4B, 5B, and 6B.

TABLE 4

Figure 6B:
FIG. 6B shows a photograph of adhesive on substrate activated by RF after drying for 5 minute at ambient temperature.

| RF heating after coating | Under 1 min | 2 min | 5 min |
|---|---|---|---|
| Thickness Range | 0.125-0.135 inch | 0.09-0.115 inch | 0.075-0.105 inch |
| Observation | Even thickness height of the dried composition, less than 10% of the substrate has wrinkles | Uneven thickness of the dried composition, greater than 40% of the substrate has wrinkles | Severe uneven height of the dried composition, thickness, greater than 80% of the substrate has wrinkles |
| Outer Appearance | FIG. 4A | FIG. 5A | FIG. 6A |
| Inside Image | FIG. 4B | FIG. 5B | FIG. 6B |

While high solids content allows for faster throughput of manufacturing, the surface of the high solids content composition can form a skin on the surface of the composition preventing egress of moisture. To minimize wrinkles and uneven foaming, the composition should be activated with RF under 1 minute. A fast throughput process comprising coating and activating the coating in under 1 minute allows for maximum benefit.

The invention claimed is:

1. An article produced by the process comprising:
   a. providing a first substrate;
   b. providing a second substrate;
   c. applying a composition in an uncoalesced state between the first substrate and the second substrate, wherein the composition comprises an (i) emulsion polymer having an initial water content of from about 35 wt % to 60 wt %, and (ii) and a plurality of expandable microspheres configured to expand at a temperature from an initial expansion temperature Texp of from about 80° C. to about 105° C. to a maximum expansion temperature of Tmax of from about 90° C. to about 140° C.;
   d. heating the composition for less than 1 minute using dielectric heating to expand the composition from a pre-expansion thickness to a post-expansion thickness that is from 77% to 81% greater than the pre-expansion thickness to form a foamed composition; and
   e. applying an adhesive between the first and the second substrate before, concurrently, or after the composition is applied between the first substrate and the second substrate; and
   wherein the foamed composition has from 0% to 15% of not expanded composition following the heating step,
   wherein the article has less than 10% wrinkles on a total surface area of the article, and
   wherein at least one of the first substrate or the second substrate is a fiberboard, a corrugated board, a solid bleached board, kraft paper, or coated paper.

2. The article of claim 1, wherein the emulsion polymer is selected from the group consisting of starch, vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane, and mixtures thereof.

3. The article of claim 1, wherein each of the plurality of expandable microspheres has a hydrocarbon core and a polyacrylonitrile shell.

4. The article of claim 1, wherein the composition further comprises an additive selected from the group consisting of a defoamer, a preservative, a surfactant, a rheology modifier, a filler, a pigment, a dye, a stabilizer, polyvinyl alcohol, a humectant, and mixtures thereof.

5. The article of claim 4, wherein the additive is present in an amount of from about 0.05 wt % to about 15 wt %, based on a total weight of the pre-expansion composition.

6. The article of claim 1, wherein the composition further comprises a second plurality of expandable microspheres having a second expansion temperature Texp2 that is different from initial expansion temperature Texp and a second maximum expansion temperature of Tmax2 that is different from maximum expansion temperature of Tmax.

7. The article of claim 1, wherein the composition further comprises a coalescence agent.

8. The article of claim 1, wherein the composition is between the first substrate and the second substrate in a pattern that is a series of dots, stripes, waves, checkerboards, or polyhedron shapes that each have a substantially flat base.

9. The article of claim 1, wherein the article is a cup, a food container, a case, a carton, a bag, a box, a lid, an envelope, a wrap, or a clamshell.

10. The article of claim 1, wherein a post-expansion diameter of the plurality of expandable microspheres is from about 3 times to about 10 times a pre-expansion diameter of the plurality of expandable microspheres.

11. The article of claim 10, wherein the plurality of expandable microspheres have a pre-expansion diameter of from about 5 microns to about 30 microns.

12. The article of claim 1, wherein the adhesive is a hot melt adhesive, a pressure sensitive adhesive, a waterborne adhesive, or a solvent-based adhesive.

13. The article of claim 1, wherein each of the plurality of expandable microspheres has a blowing agent inside a plastic or a polymeric shell, wherein the blowing agent is configured to activate upon reaching the initial expansion temperature Texp.

14. The article of claim 1, wherein the dielectric heating is radio frequency heating conducted at a frequency of less than 300 MHz.

15. The article of claim 1, wherein, pre-expansion, the composition comprises the plurality of expandable microspheres in an amount of from about 30 to about 70 wt %, based on a total weight of the pre-expansion composition.

16. The article of claim 1, wherein the composition has little to no adhesive properties in the uncoalesced state.

17. The article of claim 1, wherein the pre-expansion thickness of the composition is 0.023 inches.

18. The article of claim 1, wherein the post-expansion thickness of the foamed composition is from 0.125 to 0.135 inches.

19. The article of claim 1, wherein the composition is heated for seven seconds.

* * * * *